(12) United States Patent
Butler

(10) Patent No.: US 11,868,294 B2
(45) Date of Patent: Jan. 9, 2024

(54) IMAGE BASED PAIRING SYSTEM

(71) Applicant: Learning Squared, Inc., Sunnyvale, CA (US)

(72) Inventor: Andrew Butler, Sunnyvale, CA (US)

(73) Assignee: Learning Squared, Inc., Sunnyvale, CA (US)

( * ) Notice: Subject to any disclaimer, the term of this patent is extended or adjusted under 35 U.S.C. 154(b) by 0 days.

(21) Appl. No.: 17/360,395

(22) Filed: Jun. 28, 2021

(65) Prior Publication Data

US 2022/0414042 A1 Dec. 29, 2022

(51) Int. Cl.
| | | |
|---|---|---|
| *G06F 3/0484* | (2022.01) | |
| *G06F 3/0482* | (2013.01) | |
| *G06F 13/38* | (2006.01) | |
| *G06F 3/04812* | (2022.01) | |

(52) U.S. Cl.
CPC .......... *G06F 13/385* (2013.01); *G06F 3/0482* (2013.01); *G06F 3/0484* (2013.01); *G06F 3/04812* (2013.01)

(58) Field of Classification Search
CPC .. G06F 13/385; G06F 3/04812; G06F 3/0482; G06F 3/0484; H04W 8/005; H04W 12/50
See application file for complete search history.

(56) References Cited

U.S. PATENT DOCUMENTS

| | | | |
|---|---|---|---|
| 9,749,846 B2* | 8/2017 | Yajima | H04W 4/21 |
| 10,402,294 B1* | 9/2019 | Czeskis | G06F 9/44505 |
| 2003/0158927 A1* | 8/2003 | Sagey | H04L 41/22 |
| | | | 709/223 |
| 2012/0198531 A1 | 8/2012 | Ort et al. | |

(Continued)

FOREIGN PATENT DOCUMENTS

| | | |
|---|---|---|
| KR | 20110126438 A | 11/2011 |
| WO | WO-2023278957 A1 | 1/2023 |

OTHER PUBLICATIONS

Michael Potuck, "How to change HomeKit device icons in the Home app," Apr. 27, 2020, available at https://web.archive.org/web/20200507121206/https://9to5mac.com/2020/04/27/how-to-change-homekit-device-icons-in-the-home-app/ (Year: 2020).*

(Continued)

*Primary Examiner* — Andrew T Chiusano
(74) *Attorney, Agent, or Firm* — Schwegman Lundberg & Woessner, P.A.

(57) ABSTRACT

An image based pairing system to perform operations that include, detecting a peripheral device to be identified for use by a user of the computing device, the peripheral device comprising a display screen that displays a graphical element assigned to a memory location of the peripheral device; identifying the graphical element assigned to the memory location of the peripheral device responsive to the detecting the peripheral device at the client device; causing, by one or more processors of the computing device, display of a presentation of the graphical element assigned to the memory location of the peripheral device among a plurality of graphical elements at the computing device; receiving an input that selects the presentation of the graphical element from among the plurality of graphical elements at the computing device; and establishing a communicative connection between the computing device and the peripheral device.

20 Claims, 7 Drawing Sheets

(56) References Cited

U.S. PATENT DOCUMENTS

| | | | |
|---|---|---|---|
| 2013/0189925 A1* | 7/2013 | Staskawicz | H04W 8/005 |
| | | | 455/41.1 |
| 2015/0220110 A1 | 8/2015 | Brawer | |
| 2016/0094934 A1* | 3/2016 | Yang | H04W 8/005 |
| | | | 455/41.2 |
| 2017/0111697 A1 | 4/2017 | Choi et al. | |
| 2017/0142767 A1* | 5/2017 | Furubayashi | H04W 4/80 |
| 2018/0063310 A1* | 3/2018 | McGary | H04W 12/06 |
| 2020/0218486 A1 | 7/2020 | Behzadi et al. | |
| 2021/0149532 A1* | 5/2021 | Yoon | H04W 12/06 |

OTHER PUBLICATIONS

"International Application Serial No. PCT/US2022/073103, International Search Report dated Oct. 17, 2022", 4 pgs.
"International Application Serial No. PCT/US2022/073103, Written Opinion dated Oct. 17, 2022", 4 pgs.

\* cited by examiner

300

DETECTING A PERIPHERAL DEVICE IN PROXIMITY OF A COMPUTING DEVICE, THE PERIPHERAL DEVICE COMPRISING A DISPLAY SCREEN THAT DISPLAYS A GRAPHICAL ELEMENT ASSIGNED TO A MEMORY LOCATION OF THE PERIPHERAL DEVICE
302

IDENTIFYING THE GRAPHICAL ELEMENT ASSIGNED TO THE MEMORY LOCATION OF THE PERIPHERAL DEVICE BASED ON THE DETECTING THE PERIPHERAL DEVICE IN THE PROXIMITY OF THE COMPUTING DEVICE
304

CAUSING DISPLAY OF A PRESENTATION OF THE GRAPHICAL ELEMENT ASSIGNED TO THE MEMORY LOCATION OF THE PERIPHERAL DEVICE AMONG A PLURALITY OF GRAPHICAL ELEMENTS AT THE COMPUTING DEVICE
306

RECEIVING AN INPUT THAT SELECTS THE PRESENTATION OF THE GRAPHICAL ELEMENT FROM AMONG THE PLURALITY OF GRAPHICAL ELEMENTS AT THE COMPUTING DEVICE
308

ESTABLISHING A COMMUNICATIVE CONNECTION BETWEEN THE COMPUTING DEVICE AND THE PERIPHERAL DEVICE IN RESPONSE TO THE INPUT THAT SELECTS THE PRESENTATION OF THE GRAPHICAL ELEMENT FROM AMONG THE PLURALITY OF GRAPHICAL ELEMENTS
310

```
┌─────────────────────────────────────────────────────────────┐
│ DETECTING A SIGNAL EMITTED BY THE PERIPHERAL DEVICE, THE SIGNAL │
│           COMPRISING A SIGNAL STRENGTH                      │
│                          402                                │
└─────────────────────────────────────────────────────────────┘
                              │
                              ▼
┌─────────────────────────────────────────────────────────────┐
│ DETERMINING THAT THE SIGNAL STRENGTH OF THE SIGNAL EMITTED BY │
│   THE PERIPHERAL DEVICE TRANSGRESSES A THRESHOLD VALUE      │
│                          404                                │
└─────────────────────────────────────────────────────────────┘
                              │
                              ▼
┌─────────────────────────────────────────────────────────────┐
│   CAUSING DISPLAY OF A PRESENTATION OF THE GRAPHICAL ELEMENT │
│   AMONG A PLURLAITY OF GRAPHICAL ELEMENTS AT THE COMPUTING  │
│                         DEVICE                              │
│                          406                                │
└─────────────────────────────────────────────────────────────┘
```

```
┌─────────────────────────────────────────────────────────┐
│ RECEIVING AN ADMINISTRATOR CREDENTIAL AT THE COMPUTING DEVICE │
│                          502                            │
└─────────────────────────────────────────────────────────┘
                            ▼
┌─────────────────────────────────────────────────────────┐
│  PRESENTING A GUI THAT COMPRISES A LIST OF IDENTIFIERS THAT │
│     INCLUDE AN IDENTIFIER OF THE PERIPHERAL DEVICE      │
│                          504                            │
└─────────────────────────────────────────────────────────┘
                            ▼
┌─────────────────────────────────────────────────────────┐
│   RECEIVING A SELECTION OF THE IDENTIFIER OF THE PERIPHERAL │
│        DEVICE FROM AMONG THE LIST OF IDENTIFIERS        │
│                          506                            │
└─────────────────────────────────────────────────────────┘
                            ▼
┌─────────────────────────────────────────────────────────┐
│    CAUSING DISPLAY OF A MENU ELEMANT TO DISPLAY A LIST OF │
│ GRAPHICAL ELEMENTS, THE LIST OF GRAPHICAL ELEMENTS INCLUDING A │
│               FIRST GRAPHICAL ELEMENT                   │
│                          508                            │
└─────────────────────────────────────────────────────────┘
                            ▼
┌─────────────────────────────────────────────────────────┐
│  RECEIVING A SELECTION OF THE FIRST GRAPHICAL ELEMENT FROM │
│           AMONG THE LIST OF GRAPHICAL ELEMENTS          │
│                          510                            │
└─────────────────────────────────────────────────────────┘
                            ▼
┌─────────────────────────────────────────────────────────┐
│    ALLOCATING THE FIRST GRAPHICAL ELEMENT TO THE MEMORY │
│  LOCATION OF THE PERIPHERAL DEVICE BASED ON THE SELECTION │
│                          512                            │
└─────────────────────────────────────────────────────────┘
                            ▼
┌─────────────────────────────────────────────────────────┐
│ CAUSING THE PERIPHERAL DEVICE TO DISPLAY THE FIRST GRAPHICAL │
│            ELEMENT WITHIN THE DISPLAY SCREEN            │
│                          514                            │
└─────────────────────────────────────────────────────────┘
```

FIG. 5

IMAGE BASED PAIRING SYSTEM

TECHNICAL FIELD

The subject matter disclosed herein generally relates to the technical field of special-purpose machines that perform or otherwise facilitate pairing of a computer with one or more peripheral devices, including software-configured computerized variants of such special-purpose machines and improvements to such variants, and to the technologies by which such special-purpose machines become improved compared to other special-purpose machines that perform or otherwise facilitate pairing of a computer with one or more peripheral devices. Specifically, the present disclosure addresses systems and methods to facilitate peripheral device identification. For example, when used in the context of educational instruction and exploration systems for children such system and methods may perform or otherwise facilitate identification and pairing of one or more educational accessory devices (e.g., for teaching children in a classroom setting).

BACKGROUND

Educational curricula in schools are moving to higher levels of technology integration as computer and human interface technologies continue to progress and evolve. For example, some schools may utilize tablets with more natural interactivity and a range of wireless accessories tailored to education and classroom settings. Logistical pairing difficulties faced in pairing such accessories to tablets is a general problem that must be addressed if such systems are to reach widespread use and adoption in a scholastic setting, where technical proficiency may not always be guaranteed.

Accordingly, there exists a need for systems and methods that allow pre-school, pre-kindergarten, and kindergarten children in a classroom environment to easily introduce a computer accessory to their computing device, for each child's computing device to uniquely identify the corresponding computer accessory and pair with it, and for the computing accessory to clearly identify to which child and to which tablet the computing accessory belongs or otherwise corresponds.

BRIEF DESCRIPTION OF THE DRAWINGS

Some embodiments are illustrated by way of example and not limitation in the figures of the accompanying drawings.

FIG. 3 is a flowchart illustrating operations of the image based pairing system in performing operations to establish a communicative connection between a computing device and a peripheral device, according to some example embodiments.

FIG. 4 is a flowchart illustrating operations of the image based pairing system in performing operations to establish a communicative connection between a computing device and a peripheral device, according to some example embodiments.

FIG. 5 is a flowchart illustrating operations of the image based pairing system in allocating a graphical element to a peripheral device, according to some example embodiments.

DETAILED DESCRIPTION

Figure 1A:
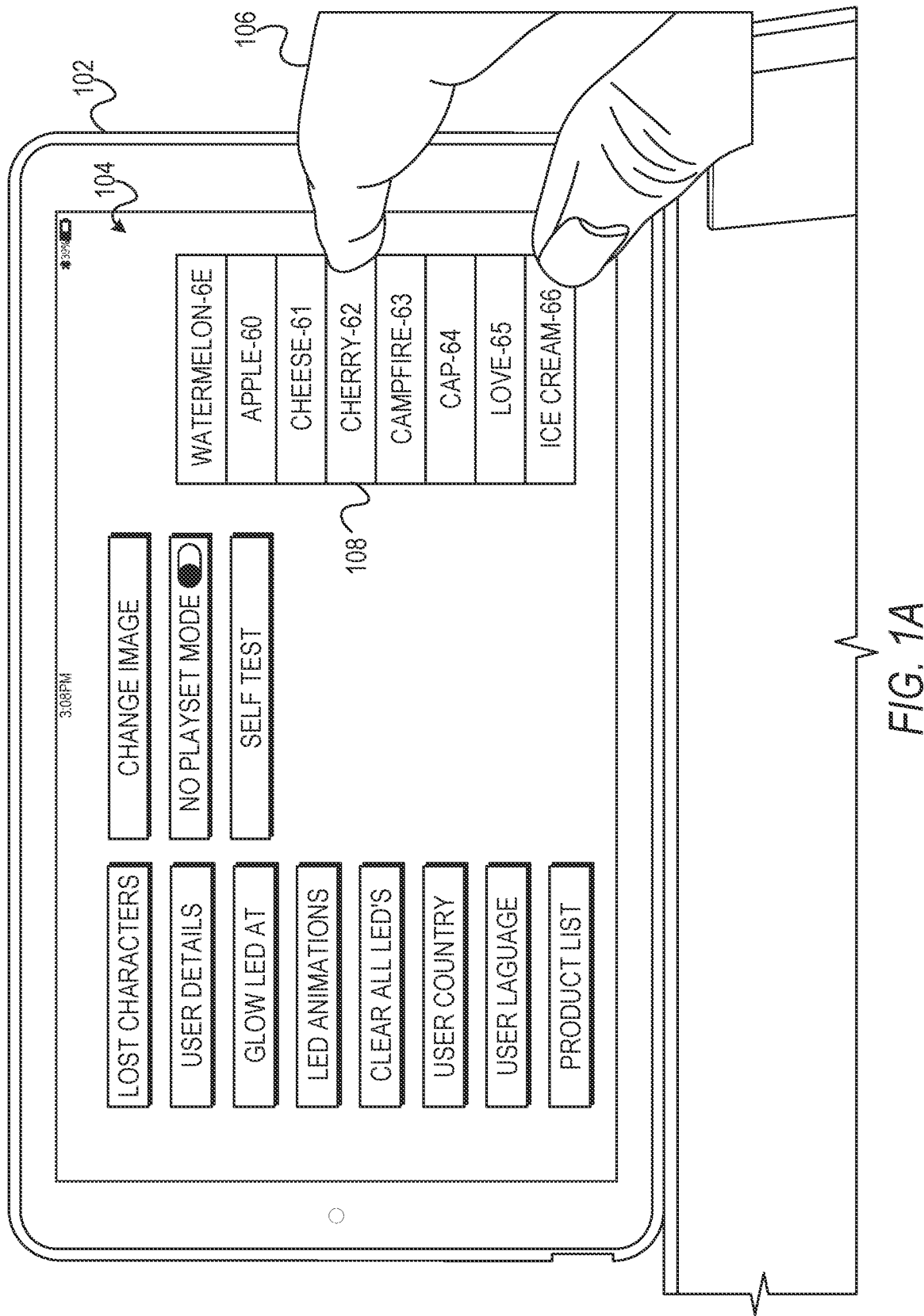
FIG. 1A is a diagram depicting a graphical user interface (GUI) of a computing device to allocate a graphical element to a peripheral device, according to some example embodiments.

Example methods facilitate peripheral device identification (e.g., identification of a computer accessory or other peripheral device), and example systems (e.g., special-purpose machines configured by special-purpose software) are configured to facilitate peripheral device identification and pairing. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

As discussed above, logistical pairing difficulties may often arise in situations where groups of users may be required to pair computing devices, such as tablets, with wireless accessories. More specifically, young students in a scholastic setting may have limited technical capability, or in some cases may not be proficiently literate, to consistently and accurately provide inputs into a computing device to pair the computing device with a wireless accessory. As a result, pairing devices with the wireless accessories may require significant oversight by teachers and caregivers of the young students, ultimately making use of such devices inconvenient and impractical for large groups. Accordingly, the disclosed system seeks to overcome this problem by providing an intuitive method to enable young students with little to no technical ability or even literacy to identify and pair wireless accessories with a computing device.

In certain example embodiments discussed herein, an image based pairing system is configured to perform operations that include, detecting, by one or more processors of a computing device, a peripheral device to be identified for use by a user of the computing device, the peripheral device comprising a display screen that displays a graphical element assigned to a memory location of the peripheral device; identifying, by one or more processors of the computing device, the graphical element assigned to the memory location of the peripheral device responsive to the detecting the peripheral device at the client device; causing, by one or more processors of the computing device, display of a presentation of the graphical element assigned to the memory location of the peripheral device among a plurality of graphical elements at the computing device; receiving an input that selects the presentation of the graphical element from among the plurality of graphical elements at the computing device; and establishing a communicative connection between the computing device and the peripheral device in response to the input that selects the presentation of the graphical element from among the plurality of graphical elements.

According to certain example embodiments, detecting of the peripheral device at the computing device may be based on a signal emitted by the peripheral device, such as a Bluetooth signal. The image based pairing system may detect one or more signals emitted from one or more peripheral devices and may infer a distance of each of the one or more peripheral devices from a computing device based on a signal strength of the signal. Responsive to detecting that a signal strength of a signal emitted by a peripheral device from among the one or more peripheral devices transgresses a threshold value (i.e., a peripheral device from among the one or more peripheral devices is within a threshold distance of the computing device), the image based pairing system may present a graphical element associated with the peripheral device among a plurality of graphical elements at a display of the computing device. In some embodiments, the plurality of graphical elements may be sorted based on their corresponding signal strength.

In some embodiments, a graphical element may be associated with a peripheral device by a user with administrative privileges via the computing device. For example, a user of the image based pairing system may provide administrative credentials to a computing device, wherein the administrative credentials correspond with a set of administrative privileges that include designation of images to peripheral devices. Responsive to receiving the credentials, the image based pairing system may cause display of an administrative interface to allocate a graphical element from among a plurality of graphical elements with a memory location of a peripheral device. For example, the user may provide a first input to select or otherwise identify a peripheral device from among a plurality of peripheral devices, and a second input that allocates a graphical element from among a plurality of graphical elements with a memory location of the peripheral device. In some embodiments, responsive to allocating the graphical element to the memory location of the peripheral device, the peripheral device may present the graphical element within a display window associated with the peripheral device.

As an illustrative example from a user perspective, a teacher of a classroom may provide administrative credentials to a computing device to login to an administrative account. The image based pairing system may display an interface that include one or more menu elements configured to receive inputs to allocate graphical elements to one or more peripheral devices. In some embodiments, a menu element may be configured to display identifiers associated with peripheral devices within a threshold distance of the computing device (e.g., based on an inferred distance determined based on signal strength). The teacher may provide inputs via the computing device to allocate graphical elements to each of the peripheral devices. Based on the received inputs, the image based pairing system may allocate graphical elements to memory locations of corresponding peripheral devices, which may in turn cause the peripheral devices to display the corresponding graphical elements on an associated display screen.

A student may then be presented with a display of one or more graphical elements associated with one or more peripheral devices within a threshold distance of a computing device of the student. To pair with one of the peripheral devices, the student may first reference a display of a selected peripheral device, wherein the display presents a graphical element associated with the peripheral device, and then provide an input to select the graphical element from among the display of the one or more graphical elements presented at the computing device. Responsive to receiving the input that selects the graphical element, the image based pairing system communicatively couples the computing device with the selected peripheral device, based on the selection of the graphical element that corresponds with the peripheral device.

FIG. 1A is a diagram depicting a GUI 104 of a computing device 102 to allocate a graphical element 108 to a peripheral device, according to some example embodiments. For example, the GUI 104 may be presented at a computing device 102 by the image based pairing system responsive to receiving a set of administrator credentials from a user of the computing device 102, as is described in the method 500 depicted in FIG. 5.

A user of the image based pairing system may provide inputs into the GUI 104 to allocate a graphical element to a peripheral device. According to certain embodiments, the image based pairing system may cause display of a list of identifiers that identify graphical elements that may be allocated to a peripheral device in proximity with the computing device 102. In some embodiments, the list of identifiers may include a display of the corresponding graphical elements identified by the identifiers or may simply comprise a display of the graphical elements themselves. A user of the image based pairing system may allocate a graphical element identified by the identifier 108 by providing an input 106 that selects the identifier 108 from among the list of identifiers. Responsive to receiving the input 106 that selects the identifier 108, the image based pairing system may cause the computing device 102 to transmit a request to a peripheral device in proximity of the computing device 102, wherein the request includes the selected identifier 108. The peripheral device may select a graphical element from among a collection of graphical elements based on the identifier 108, and cause display of a presentation of the graphical element at a display of the peripheral device, as is depicted in FIG. 1B.

Figure 1B:
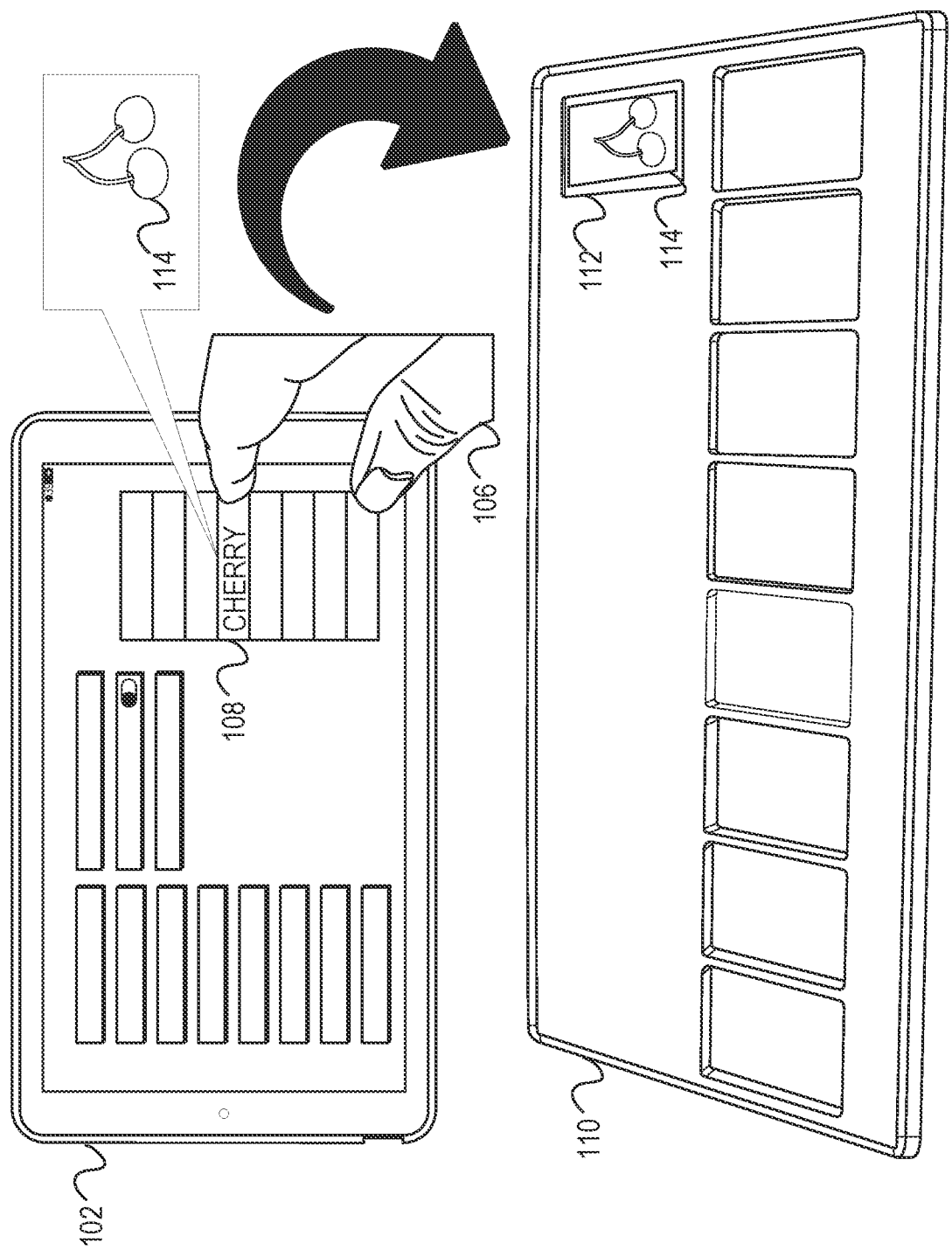
FIG. 1B is a diagram depicting operations of the image based pairing system in allocating a graphical element to a peripheral device, according to some example embodiments.

FIG. 1B is a diagram depicting operations of the image based pairing system in allocating a graphical element 114 to a peripheral device 110, according to some example embodiments. As seen in FIG. 1B, a user may provide an input 106 that selects the identifier 108, wherein the identifier 108 identifies the graphical element 114.

Responsive to receiving the input 106 that selects the identifier 108, the image based pairing system may cause the computing device 102 to transmit a request to the peripheral device 110, wherein the request includes the identifier 108, or a reference to the identifier 108. The peripheral device 110 causes display of a presentation of the graphical element 114 within a corresponding display window 112 of the peripheral device 110, to indicate that the graphical element 114 has been allocated to a memory location of the peripheral device 110.

Figure 2:
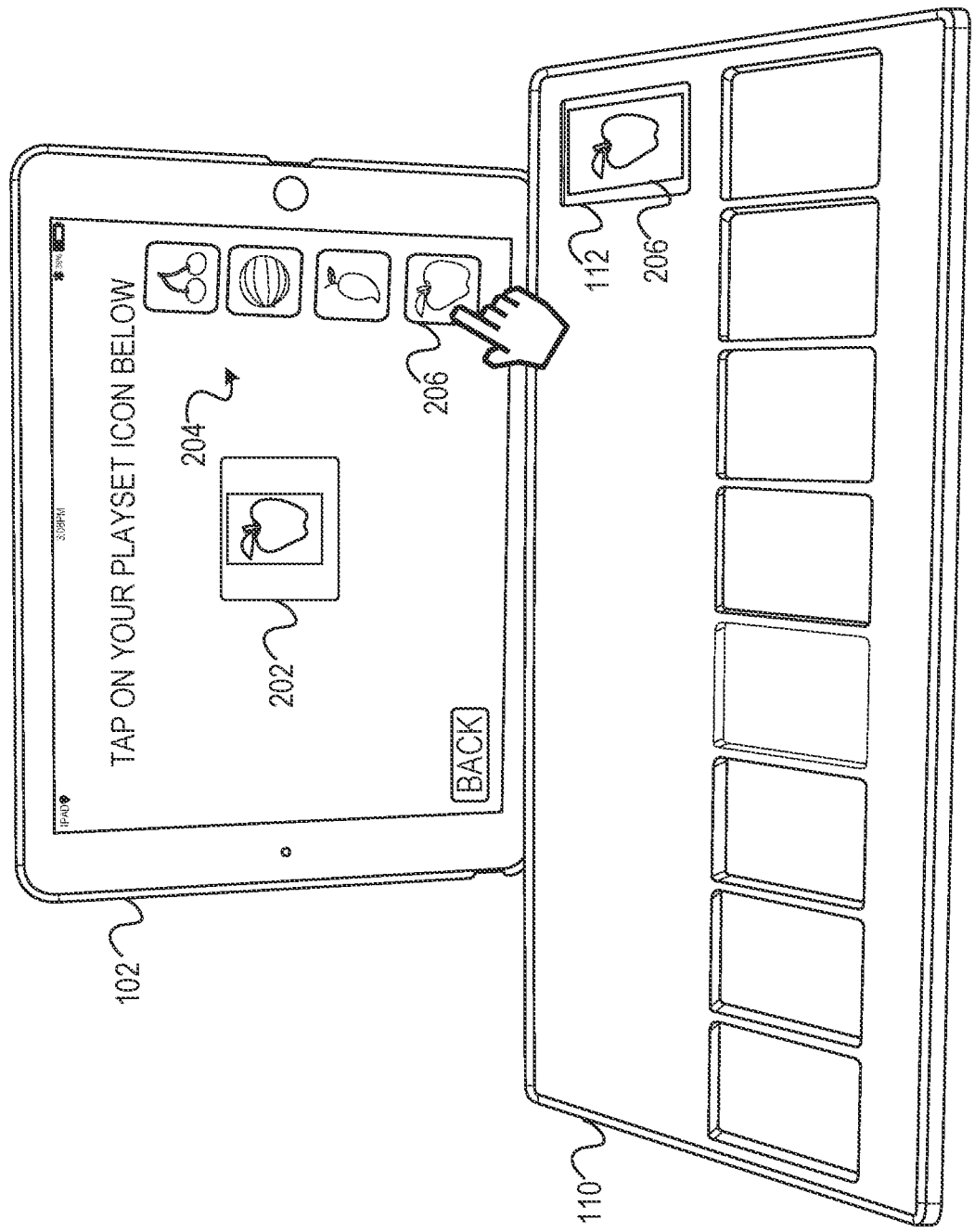
FIG. 2 is a diagram depicting operations of an image based pairing system in pairing a computing device with a peripheral device, according to some example embodiments.

FIG. 2 is a diagram depicting operations of an image based pairing system in pairing a computing device 102 with a peripheral device 110, according to some example embodiments. As seen in FIG. 2, and as described in the method 300 described in FIG. 3, in some embodiments, the computing device 102 may cause display of a plurality of graphical elements 204 within a GUI of the computing device 102, wherein the plurality of graphical elements 204 may correspond with (i.e., have been allocated to memory locations of) a plurality of peripheral devices, such as the peripheral device 110. For example, the computing device 110 may detect a plurality of peripheral devices within a threshold distance of the computing device 102, wherein each peripheral device among the plurality of peripheral devices is associated with a corresponding graphical element. Responsive to detecting the plurality of peripheral devices within a threshold distance of the computing device 102, the image based pairing system may cause the computing device 102 to display a presentation of the plurality of graphical elements 204.

A user of the computing device 102 may thereby establish a communicative connection with a peripheral device from among the plurality of peripheral devices, by providing an input that selects a corresponding graphical element from the display of the plurality of graphical elements 204. For example, as seen in FIG. 2, the peripheral device 110 is associated with the graphical element 206, which is presented within the display 112 of the peripheral device, as well as among the plurality of graphical elements 204 at the computing device 102. A user may provide an input to select the graphical element 206, and in response, the image based pairing system may cause the computing device 102 to establish a communicative connection with the peripheral device 110, such as a Bluetooth connection.

In some embodiments, responsive to receiving an input that selects the graphical element 206 at the computing device, the image based pairing system may display a presentation 202 of the graphical element 206 at the computing device 102, in order to convey to a user of the computing device 102 that a selection has been made, or that a communicative connection has been established with the peripheral device 110 that corresponds with the graphical element 206.

In some embodiments, the image based pairing system may provide a confirmation that the communicative connection has been established. The confirmation may for example include the presentation 202 of the graphical element 206, as well as a display of an identifier associated with the computing device 102 within the display window 112 of the peripheral device 110.

FIG. 3 is a flowchart illustrating operations of an image based pairing system in performing a method 300 by which a computing device may be paired with a peripheral device in proximity of the computing device based on a selection of a graphical element associated with the peripheral device, according to some example embodiments. Operations in the method 300 may be performed by the computing device and peripheral device, including by one or more processors (e.g., microprocessors or other hardware processors) thereof. As shown in FIG. 3, the method 300 includes operations 302, 304, 306, 308, and 310.

At operation 302, the computing device detects a peripheral device in proximity of the computing device, wherein the peripheral device comprises a display screen that displays a graphical element assigned to a memory location of the peripheral device.

At operation 304, the computing device identifies the graphical element assigned to the memory location of the peripheral device based on the detecting the peripheral device in proximity of the computing device. For example, the peripheral device may emit a signal, wherein the signal comprises an identifier associated with the graphical element. Accordingly, the computing device may reference a graphical element database that comprises a collection of graphical elements and may identify the graphical element from among the collection of graphical elements based on the identifier.

At operation 306, the computing device causes display of a presentation of the graphical element assigned to the memory location of the peripheral device among a plurality of graphical elements.

At operation 308, the computing device receives an input that selects the graphical element assigned to the memory location of the peripheral device from among the plurality of graphical elements.

At operation 310, responsive to the input that selects the graphical element assigned to the memory location of the peripheral device, the computing device establishes a communicative connection with the peripheral device. For example, the communicative connection may include a wireless connection, such as a Bluetooth connection.

FIG. 4 is a flowchart illustrating operations of an image based pairing system in performing a method 400 by which a computing device may detect a peripheral device in proximity with the computing device, according to some example embodiments. Operations in the method 400 may be performed by the computing device and peripheral device, including by one or more processors (e.g., microprocessors or other hardware processors) thereof. As shown in FIG. 4, the method 400 includes operations 402, 404, and 406.

At operation 402, the computing device detects a signal emitted by the peripheral device, wherein the signal comprises an attribute that includes a signal strength. For example, the signal may include a Bluetooth signal.

At operation 404, the computing device infers a distance of the peripheral device based on the signal strength and may determine that the signal strength transgresses a threshold value which indicates that the peripheral device is within a threshold distance of the computing device.

In some embodiments, the thresholds, including the threshold value and the threshold distance, may be defined based on user inputs into the computing device or the peripheral device. For example, an administrator of the image based pairing system may provide inputs to define a threshold value or distance.

At operation 406, responsive to determining that the signal strength of the signal emitted by the peripheral device transgresses a threshold value, the computing device causes display of a presentation of the graphical element associated to the memory location of the peripheral device within a GUI of the computing device. In some embodiments, the presentation of the graphical element may be among a plurality of graphical elements associated with other peripheral devices within a proximity of the computing device.

In some embodiments, the plurality of graphical elements may be sorted or ranked based on corresponding signal strengths. For example, the computing device may detect a plurality of peripheral devices based on signals emitted by each peripheral device among the plurality of peripheral devices. Upon determining that at least a portion of the signals emitted by the plurality of peripheral devices transgresses a threshold value (i.e., a threshold signal strength), the image based pairing system may rank the plurality of peripheral devices based on the corresponding signal strengths. The plurality of graphical elements may therefore be displayed based on the ranking.

FIG. 5 is a flowchart illustrating operations of an image based pairing system in performing a method 500 by which an image may be associated with a peripheral device, according to some example embodiments. Operations in the method 500 may be performed by the computing device and peripheral device, including by one or more processors (e.g., microprocessors or other hardware processors) thereof. As shown in FIG. 5, the method 500 includes operations 502, 504, 506, 508, 510, 512, and 514.

At operation 502, the computing device receive an administrator credential. For example, a user may provide login information that corresponds with an administrative account.

At operation 504, responsive to receiving the administrator credential, the image based pairing system causes display of a GUI that comprises a list of identifiers that include an identifier associated with the peripheral device. For example, the list of identifiers may comprise one or more identifiers associated with peripheral devices that are within a proximity of the computing device.

At operation 506, the computing device receive an input that selects an identifier associated with a peripheral device from among the list of identifiers. For example, the list of identifiers may be presented within a drop-down menu within a GUI of the computing device. A user of the computing device may provide an input, such as a tactile input, that selects the identifier from the drop-down menu.

At operation 508, responsive to the input that selects the identifier of the peripheral device, the image based pairing system presents a menu element at the computing device, wherein the menu element comprises a display of a plurality of graphical elements from a collection of graphical elements.

In some embodiments, a user of the image based pairing system may provide an input to upload, or add graphical elements to the collection of graphical elements, or may provide inputs to select one or more graphical elements to be included within the display of the plurality of graphical elements.

At operation 510, the computing device receives an input that selects a first graphical element from the display of the plurality of graphical elements. For example, the input may include a tactile input.

At operation 512, responsive to receiving the input that selects the first graphical element from the display of the plurality of graphical elements, the image based pairing system allocates the first graphical element to the memory location of the peripheral device.

For example, in some embodiments the first graphical element may be correlated with a graphical element identifier within parallel graphical element databases located within memories of the computing device and the peripheral device. Responsive to receiving the input that selects the first graphical element from the display of the plurality of graphical elements, a request may be transmitted from the computing device to the peripheral device, wherein the request includes a graphical element identifier that corresponds with the first graphical element. The peripheral device may thereby access a graphical element database to identify the first graphical element to be displayed upon the display of the peripheral device.

Figure 6:
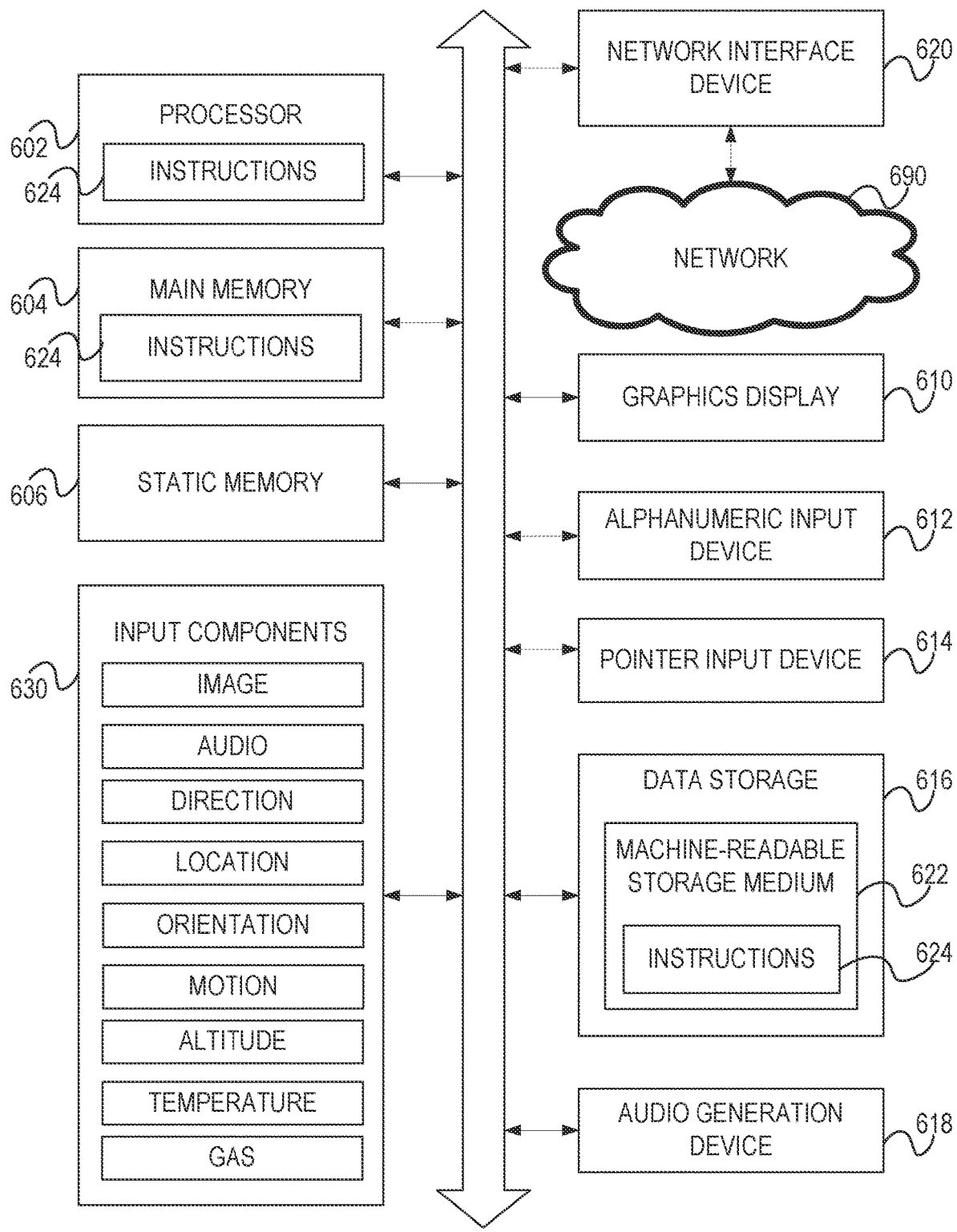
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically. FIG. 6 shows the machine 600 in the example form of a computer system (e.g., a computer, such as the tablet computer 130 or the symbol manipulative identification dock 120) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be communicatively coupled (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 604, and a static memory 606, which are configured to communicate with each other via a bus 608. The processor 602 contains solid-state digital microcircuits (e.g., electronic, optical, or both) that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein. In some example embodiments, the processor 602 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 600 with at least the processor 602, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a pointer input device 614 (e.g., a mouse, a touchpad, a touchscreen, a trackball, a joystick, a stylus, a motion sensor, an eye tracking device, a data glove, or other pointing instrument), a data storage 616, an audio generation device 618 (e.g., a sound card, an amplifier, a speaker, a headphone jack, or any suitable combination thereof), and a network interface device 620.

The data storage 616 (e.g., a data storage device) includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the static memory 606, within the processor 602 (e.g., within the processor's cache memory), or any suitable combination thereof, before or during execution thereof by the machine 600. Accordingly, the main memory 604, the static memory 606, and the processor 602 may be considered machine-readable media (e.g., tangible and non-transitory machine-readable media). The instructions 624 may be transmitted or received over a network 690 via the network interface device 620. For example, the network interface device 620 may communicate the instructions 624 using any one or more transfer protocols (e.g., hypertext transfer protocol (HTTP)).

In some example embodiments, the machine 600 may be a portable computing device (e.g., a smart phone, a tablet computer, or a wearable device) and may have one or more additional input components 630 (e.g., sensors or gauges). Examples of such input components 630 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 630 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 624 for execution by the machine 600 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 624).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols." "characters." "terms," "numbers," "numerals." or the like. These words, however, are merely convenient labels and are to be associated with appropriate physical quantities.

Unless specifically stated otherwise, discussions herein using words such as "accessing." "processing," "detecting." "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

A first example embodiment provides a method comprising: detecting, by one or more processors of a computing device, a peripheral device to be identified for use by a user of the computing device, the peripheral device comprising a display screen that displays a graphical element assigned to a memory location of the peripheral device;
  identifying, by one or more processors of the computing device, the graphical element assigned to the memory location of the peripheral device responsive to the detecting the peripheral device at the computing device;
  causing, by one or more processors of the computing device, display of a presentation of the graphical element assigned to the memory location of the peripheral device among a plurality of graphical elements at the computing device;
  receiving an input that selects the presentation of the graphical element from among the plurality of graphical elements at the computing device; and
  establishing a communicative connection between the computing device and the peripheral device in response to the input that selects the presentation of the graphical element from among the plurality of graphical elements.

A second example provides a method according to the first example, wherein the detecting the peripheral device at the computing device includes:
  detecting a signal emitted by the peripheral device by the one or more processors of the computing device, the signal comprising a signal strength;

determining that the signal strength of the signal emitted by the peripheral device transgresses a threshold value; and causing display of the presentation of the graphical element assigned to the memory location of the peripheral device among the plurality of graphical elements in response to the determining that the signal transgresses the threshold value.

A third example provides a method according to the second example, wherein the detecting the peripheral device at the computing device includes detecting a plurality of peripheral devices at the computing device, and the method further comprises:

determining a ranking of the peripheral device among the plurality of peripheral devices based on the signal strength; and causing display of the presentation of the graphical element assigned to the memory location of the peripheral device among the plurality of graphical elements based on the ranking.

A fourth example provides a method according to the first example, wherein the graphical element is a first graphical element, the peripheral device includes an identifier, and the method further comprises:

receiving an administrator credential at the computing device;

presenting a graphical user interface that comprises a display of a list of identifiers, the list of identifiers including the identifier of the peripheral device;

receiving a selection of the identifier of the peripheral device from among the list of identifiers;

causing display of a menu element to display a list of graphical elements, the list of graphical elements comprising the first graphical element;

causing the peripheral device to display the first graphical element within the display screen based on the assigning the graphical element to the memory location of the peripheral device.

A fifth example provides a method according to the first example, wherein the peripheral device includes an identifier, and the presentation of the graphical element assigned to the memory location of the peripheral devices includes a display of the identifier of the peripheral device.

A sixth example provides a method according to the first example, wherein the computing device includes a device identifier, and wherein the method further comprises:

causing the peripheral device to display a confirmation of the communicative connection within the display screen, the confirmation indicates the device identifier of the computing device.

A seventh example provides a method according to the first example, wherein the detecting the peripheral device at the computing device includes:

detecting, by one or more processors of the computing device, a plurality of peripheral devices based on signals emitted by the plurality of peripheral devices;

selecting a subset of the plurality of peripheral devices based on an attribute of the signals emitted by the plurality of peripheral devices; and causing display of graphical elements associated with each of the subset of the plurality of peripheral devices at the computing device.

An eighth example provides a machine-readable medium (e.g., a non-transitory machine-readable storage medium) comprising instructions, when executed by one or more processors of a primary device, cause the primary device to perform operations comprising:

detecting, by one or more processors of a computing device, a peripheral device to be identified for use by a user of the computing device, the peripheral device comprising a display screen that displays a graphical element assigned to a memory location of the peripheral device;

identifying, by one or more processors of the computing device, the graphical element assigned to the memory location of the peripheral device responsive to the detecting the peripheral device at the computing device;

causing, by one or more processors of the computing device, display of a presentation of the graphical element assigned to the memory location of the peripheral device among a plurality of graphical elements at the computing device;

receiving an input that selects the presentation of the graphical element from among the plurality of graphical elements at the computing device; and establishing a communicative connection between the computing device and the peripheral device in response to the input that selects the presentation of the graphical element from among the plurality of graphical elements.

A ninth example provides a machine-readable storage medium according to the eighth example, wherein the detecting the peripheral device at the client device includes:

detecting a signal emitted by the peripheral device by the one or more processors of the client device, the signal comprising a signal strength;

determining that the signal strength of the signal emitted by the peripheral device transgresses a threshold value; and causing display of the presentation of the graphical element assigned to the memory location of the peripheral device among the plurality of graphical elements in response to the determining that the signal transgresses the threshold value.

A tenth example provides a machine-readable storage medium according to the ninth example, wherein the detecting the peripheral device at the client device includes detecting a plurality of peripheral devices at the client device, and the operations further comprise:

determining a ranking of the peripheral device among the plurality of peripheral devices based on the signal strength; and causing display of the presentation of the graphical element assigned to the memory location of the peripheral device among the plurality of graphical elements based on the ranking.

An eleventh example provides a machine-readable storage medium according to the eighth example, wherein the graphical element is a first graphical element, the peripheral device includes an identifier, and the operations further comprise:

receiving an administrator credential at the client device;

presenting a graphical user interface that comprises a display of a list of identifiers, the list of identifiers including the identifier of the peripheral device;

receiving a selection of the identifier of the peripheral device from among the list of identifiers;

causing display of a menu element to display a list of graphical elements, the list of graphical elements comprising the first graphical element;

causing the peripheral device to display the first graphical element within the display screen based on the assigning the graphical element to the memory location of the peripheral device.

A twelfth example provide a machine-readable storage medium according to the eighth example, wherein the peripheral device includes an identifier, and the presentation of the graphical element assigned to the memory location of the peripheral devices includes a display of the identifier of the peripheral device.

A thirteenth example provides a machine-readable storage medium according to the eighth example, wherein the client device includes a device identifier, and wherein the operations further comprise:
  causing the peripheral device to display a confirmation of the communicative connection within the display screen, the confirmation indicating the device identifier of the client device.

A fourteenth example provides a machine-readable storage medium according to the eighth example, wherein the detecting the peripheral device at the client device includes:
  detecting, by one or more processors of the client device, a plurality of peripheral devices based on signals emitted by the plurality of peripheral devices;
  selecting a subset of the plurality of peripheral devices based on an attribute of the signals emitted by the plurality of peripheral devices; and
  causing display of graphical elements associated with each of the subset of the plurality of peripheral devices at the client device.

A fifteenth example provides a system comprising a peripheral device, one or more processors, and a memory storing instructions, that when executed by at least one processor among the one or more processors of the system, cause the system to perform operations comprising:
  detecting, by one or more processors of a computing device, the peripheral device to be identified for use by a user of the client device, the peripheral device comprising a display screen that displays a graphical element assigned to a memory location of the peripheral device;
  identifying, by one or more processors of the client device, the graphical element assigned to the memory location of the peripheral device responsive to the detecting the peripheral device at the client device;
  causing, by one or more processors of the client device, display of a presentation of the graphical element assigned to the memory location of the peripheral device among a plurality of graphical elements at the client device;
  receiving an input that selects the presentation of the graphical element from among the plurality of graphical elements at the client device; and
  establishing a communicative connection between the client device and the peripheral device in response to the input that selects the presentation of the graphical element from among the plurality of graphical elements.

A sixteenth example provides the system of the fifteenth example, wherein the detecting the peripheral device at the client device includes:
  detecting a signal emitted by the peripheral device by the one or more processors of the client device, the signal comprising a signal strength;
  determining that the signal strength of the signal emitted by the peripheral device transgresses a threshold value; and
  causing display of the presentation of the graphical element assigned to the memory location of the peripheral device among the plurality of graphical elements in response to the determining that the signal transgresses the threshold value.

A seventeenth example provides the system of the sixteenth example, wherein the detecting the peripheral device at the client device includes detecting a plurality of peripheral devices at the client device, and the operations further comprise:
  determining a ranking of the peripheral device among the plurality of peripheral devices based on the signal strength; and
  causing display of the presentation of the graphical element assigned to the memory location of the peripheral device among the plurality of graphical elements based on the ranking.

An eighteenth example provides the system of the fifteenth example, wherein the graphical element is a first graphical element, the peripheral device includes an identifier, and the operations further comprise:
  receiving an administrator credential at the client device;
  presenting a graphical user interface that comprises a display of a list of identifiers, the list of identifiers including the identifier of the peripheral device;
  receiving a selection of the identifier of the peripheral device from among the list of identifiers;
  causing display of a menu element to display a list of graphical elements, the list of graphical elements comprising the first graphical element;
  causing the peripheral device to display the first graphical element within the display screen based on the assigning the graphical element to the memory location of the peripheral device.

A nineteenth example provides the system of the fifteenth example, wherein the peripheral device includes an identifier, and the presentation of the graphical element assigned to the memory location of the peripheral devices includes a display of the identifier of the peripheral device.

A twentieth example provides the system of the fifteenth example, wherein the client device includes a device identifier, and wherein the operations further comprise:
  causing the peripheral device to display a confirmation of the communicative connection within the display screen, the confirmation indicating the device identifier of the client device.

What is claimed is:

1. A method comprising:
  detecting, by one or more processors of a computing device of an end user, multiple peripheral devices within a threshold distance of the computing device, the detected multiple peripheral devices including a peripheral device to be identified from among the multiple peripheral devices and paired with the computing device for use by the end user of the computing device while other peripheral devices among the detected multiple peripheral devices are to be paired with other computing devices of other end users for use by the other end users, the peripheral device comprising a display screen that displays a graphical element assigned by an administrative user to the peripheral device, the display screen of the peripheral device displaying the graphical element in response to the graphical element being assigned to the peripheral device by the administrative user;
  causing, by one or more processors of the computing device, display of the graphical element assigned by the administrative user to the peripheral device, the graphical element assigned to the peripheral device being displayed among a displayed plurality of graphical elements assigned by the administrative user to other peripheral devices among the detected multiple peripheral devices for use by the other end users;

receiving, by the one or more processors of the computing device, an end user input that selects the displayed graphical element assigned by the administrative user to the peripheral device from among the displayed plurality of graphical elements assigned by the administrative user to the other peripheral devices; and establishing, by the one or more processors of the computing device, a pairing connection between the computing device of the end user and the peripheral device assigned by the administrative user to the displayed graphical element in response to the end user input selecting the displayed graphical element from among the displayed plurality of graphical elements assigned by the administrative user to the other peripheral devices for use by the other end users.

2. The method of claim 1, wherein the detecting of the multiple peripheral devices includes:
detecting a signal emitted by the peripheral device; and
determining that a signal strength of the signal emitted by the peripheral device transgresses a threshold value; and wherein:
the causing of the display of the graphical element assigned to the peripheral device among the plurality of graphical elements is in response to the determining that the signal strength transgresses the threshold value.

3. The method of claim 2, further comprising:
determining a ranking of the peripheral device among the multiple peripheral devices based on the signal strength of the signal emitted by the peripheral device; and wherein:
the causing of the display of the graphical element assigned to the peripheral device among the plurality of graphical elements is based on the ranking.

4. The method of claim 1, wherein the graphical element is a first graphical element, the peripheral device includes an identifier, and the method further comprises:
presenting a graphical user interface that comprises a display of a list of identifiers including the identifier of the peripheral device;
receiving a selection of the identifier of the peripheral device from among the list of identifiers;
causing display of a menu element to display a list of graphical elements including the first graphical element; and
causing the peripheral device to display the first graphical element within the display screen of the peripheral device in response to the first graphical element being assigned by the administrative user to the peripheral device.

5. The method of claim 1, wherein the peripheral device includes an identifier, and the display of the graphical element assigned to the peripheral device includes the identifier of the peripheral device.

6. The method of claim 1, wherein the computing device includes a device identifier, and wherein the method further comprises:
causing the peripheral device to display a confirmation of the pairing connection within the display screen of the peripheral device, the confirmation including the device identifier of the computing device.

7. The method of claim 1, wherein the detecting of the multiple peripheral devices includes:
detecting, by one or more processors of the computing device, the multiple peripheral devices based on signals emitted by the multiple peripheral devices;
selecting a subset of the multiple peripheral devices based on an attribute of the signals emitted by the multiple peripheral devices; and
causing display of graphical elements associated with the subset of the multiple peripheral devices at the computing device.

8. A non-transitory machine-readable medium comprising instructions that, when executed by one or more processors of a primary device of an end user, cause the primary device to perform operations comprising:
detecting multiple peripheral devices within a threshold distance of the primary device, the detected multiple peripheral devices including a peripheral device to be identified from among the multiple peripheral devices and paired with the primary device for use by the end user of the primary device while other peripheral devices among the detected multiple peripheral devices are to be paired with other computing devices of other end users for use by the other end users, the peripheral device comprising a display screen that displays a graphical element assigned by an administrative user to the peripheral device, the display screen of the peripheral device displaying the graphical element in response to the graphical element being assigned to the peripheral device by the administrative user;
causing display of the graphical element assigned by the administrative user to the peripheral device, the graphical element assigned to the peripheral device being displayed among a displayed plurality of graphical elements assigned by the administrative user to other peripheral devices among the detected multiple peripheral devices for use by the other end users;
receiving an end user input that selects the displayed graphical element assigned by the administrative user to the peripheral device from among the displayed plurality of graphical elements assigned by the administrative user to the other peripheral devices; and
establishing a pairing connection between the primary device of the end user and the peripheral device assigned by the administrative user to the displayed graphical element in response to the end user input selecting the displayed graphical element from among the displayed plurality of graphical elements assigned by the administrative user to the other peripheral devices for use by the other end users.

9. The non-transitory machine-readable medium of claim 8, wherein the detecting of the multiple peripheral devices includes:
detecting a signal emitted by the peripheral device; and
determining that a signal strength of the signal emitted by the peripheral device transgresses a threshold value; and wherein:
the causing of the display of the graphical element assigned to the peripheral device among the plurality of graphical elements is in response to the determining that the signal strength transgresses the threshold value.

10. The non-transitory machine-readable medium of claim 9, wherein the operations further comprise:
determining a ranking of the peripheral device among the multiple peripheral devices based on the signal strength emitted by the peripheral device; and wherein:

the causing of the display of the graphical element assigned to the peripheral device among the plurality of graphical elements is based on the ranking.

11. The non-transitory machine-readable medium of claim 8, wherein the graphical element is a first graphical element, the peripheral device includes an identifier, and the operations further comprise:
presenting a graphical user interface that comprises a display of a list of identifiers including the identifier of the peripheral device;
receiving a selection of the identifier of the peripheral device from among the list of identifiers;
causing display of a menu element to display a list of graphical elements including the first graphical element; and
causing the peripheral device to display the first graphical element within the display screen of the peripheral device in response to the first graphical element being assigned by the administrative user to the peripheral device.

12. The non-transitory machine-readable medium of claim 8, wherein the peripheral device includes an identifier, and the display of the graphical element assigned to the peripheral device includes the identifier of the peripheral device.

13. The non-transitory machine-readable medium of claim 8, wherein the primary device includes a device identifier, and wherein the operations further comprise:
causing the peripheral device to display a confirmation of the pairing connection within the display screen of the peripheral device, the confirmation including the device identifier of the primary device.

14. The non-transitory machine-readable medium of claim 8, wherein the detecting of the multiple peripheral devices includes:
detecting, by one or more processors of the primary device, the multiple peripheral devices based on signals emitted by the multiple peripheral devices;
selecting a subset of the multiple peripheral devices based on an attribute of the signals emitted by the multiple peripheral devices; and
causing display of graphical elements associated with the subset of the multiple peripheral devices at the primary device.

15. A system comprising:
one or more processors; and
a memory storing instructions that, when executed by at least one processor among the one or more processors, cause the system to perform operations comprising:
detecting multiple peripheral devices within a threshold distance of the system, the detected multiple peripheral devices including a peripheral device to be identified from among the multiple peripheral devices and paired with the system for use by an end user of the system while other peripheral devices among the detected multiple peripheral devices are to be paired with other systems of other end users for use by the other end users, the peripheral device comprising a display screen that displays a graphical element assigned by an administrative user to the peripheral device, the display screen of the peripheral device displaying the graphical element in response to the graphical element being assigned to the peripheral device by the administrative user;
causing display of the graphical element assigned by the administrative user to the peripheral device, the graphical element assigned to the peripheral device being displayed among a displayed plurality of graphical elements assigned by the administrative user to other peripheral devices among the detected multiple peripheral devices for use by the other end users;
receiving an end user input that selects the displayed graphical element assigned by the administrative user to the peripheral device from among the displayed plurality of graphical elements assigned by the administrative user to the other peripheral devices; and
establishing a pairing connection between the system of the end user and the peripheral device assigned by the administrative user to the displayed graphical element in response to the end user input selecting the displayed graphical element from among the displayed plurality of graphical elements assigned by the administrative user to the other peripheral devices for use by the other end users.

16. The system of claim 15, wherein the detecting of the multiple peripheral devices includes:
detecting a signal emitted by the peripheral device; and
determining that a signal strength of the signal emitted by the peripheral device transgresses a threshold value; and wherein:
the causing of the display of the graphical element assigned to the peripheral device among the plurality of graphical elements is in response to the determining that the signal strength transgresses the threshold value.

17. The system of claim 16, wherein the operations further comprise:
determining a ranking of the peripheral device among the multiple peripheral devices based on the signal strength emitted by the peripheral device; and wherein:
the causing of the display of the graphical element assigned to the peripheral device among the plurality of graphical elements is based on the ranking.

18. The system of claim 15, wherein the graphical element is a first graphical element, the peripheral device includes an identifier, and the operations further comprise:
presenting a graphical user interface that comprises a display of a list of identifiers including the identifier of the peripheral device;
receiving a selection of the identifier of the peripheral device from among the list of identifiers;
causing display of a menu element to display a list of graphical elements including the first graphical element;
causing the peripheral device to display the first graphical element within the display screen of the peripheral device in response to the first graphical element being assigned by the administrative user to the peripheral device.

19. The system of claim 15, wherein the peripheral device includes an identifier, and the display of the graphical element assigned to the peripheral device includes the identifier of the peripheral device.

20. The system of claim 15, wherein the system includes a device identifier, and wherein the operations further comprise:
causing the peripheral device to display a confirmation of the pairing connection within the display screen of the peripheral device, the confirmation including the device identifier of the system.

* * * * *

UNITED STATES PATENT AND TRADEMARK OFFICE
CERTIFICATE OF CORRECTION

| | | |
|---|---|---|
| PATENT NO. | : 11,868,294 B2 | Page 1 of 1 |
| APPLICATION NO. | : 17/360395 | |
| DATED | : January 9, 2024 | |
| INVENTOR(S) | : Andrew Butler | |

It is certified that error appears in the above-identified patent and that said Letters Patent is hereby corrected as shown below:

In the Drawings

Sheet 5 of 7, Fig. 4, reference numeral 406, Line 2, delete "PLURLAITY" and insert --PLURALITY-- therefor On sheet 6 of 7, Fig. 5, reference numeral 508, Line 1, delete "ELEMANT" and insert --ELEMENT-- therefor In the Specification In Column 4, Line 66, delete "110" and insert --102-- therefor In Column 7, Line 62, delete "Specifically." and insert --Specifically,-- therefor In Column 12, Lines 18-19, delete ""symbols." "characters."" and insert --"symbols," "characters,"-- therefor In Column 12, Line 19, delete ""numerals."" and insert --"numerals,"-- therefor In Column 12, Line 23, delete ""accessing."" and insert --"accessing,"-- therefor In Column 12, Line 23, delete ""detecting."" and insert --"detecting,"-- therefor Signed and Sealed this
Nineteenth Day of November, 2024

*Katherine Kelly Vidal*

Katherine Kelly Vidal
*Director of the United States Patent and Trademark Office*